(12) United States Patent
Rao et al.

(10) Patent No.: US 11,153,075 B2
(45) Date of Patent: Oct. 19, 2021

(54) SYSTEMS AND METHODS FOR MINIMIZING BOOT TIME WHEN USING A UNIQUE KEY ENCRYPTION KEY PER STORAGE RESOURCE IN SECURE ENTERPRISE KEY MANAGEMENT PROVISIONING

(71) Applicant: Dell Products L.P., Round Rock, TX (US)

(72) Inventors: Balaji B. Rao, Austin, TX (US); Chandrashekar Nelogal, Round Rock, TX (US); Swathi Prasad Neti, Georgetown, TX (US); Chandrashekara Lingaiah Nagaratna, Austin, TX (US); Divya Vijayvargiya, Cedar Park, TX (US); Diwahar Natarajan, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 154 days.

(21) Appl. No.: 16/737,704

(22) Filed: Jan. 8, 2020

(65) Prior Publication Data

US 2021/0211278 A1   Jul. 8, 2021

(51) Int. Cl.
*H04L 9/08*   (2006.01)
*H04L 9/14*   (2006.01)
*G06F 21/60*   (2013.01)
*G06F 9/4401*   (2018.01)

(52) U.S. Cl.
CPC .......... *H04L 9/0822* (2013.01); *G06F 9/4401* (2013.01); *G06F 21/602* (2013.01); *H04L 9/14* (2013.01)

(58) Field of Classification Search
CPC ....... H04L 9/0822; H04L 9/14; G06F 21/602; G06F 9/4401
See application file for complete search history.

(56) References Cited

U.S. PATENT DOCUMENTS

| | | | |
|---|---|---|---|
| 7,752,456 B2 * | 7/2010 | England | G06F 21/6218 713/189 |
| 11,048,802 B2 * | 6/2021 | Xu | G06F 9/4401 |
| 2006/0088167 A1 * | 4/2006 | Bade | G06F 21/57 380/281 |
| 2007/0294582 A1 | 12/2007 | Rangarajan et al. | |
| 2015/0331694 A1 | 11/2015 | Balakrishnan et al. | |
| 2017/0277545 A1 | 9/2017 | Dambal et al. | |
| 2020/0104140 A1 * | 4/2020 | Liu | G06F 3/0629 |

* cited by examiner

*Primary Examiner* — Abiy Getachew
(74) *Attorney, Agent, or Firm* — Jackson Walker L.L.P.

(57) ABSTRACT

In accordance with embodiments of the present disclosure, a key management utility may be configured to, during boot of an information handling system, prioritize retrieval of key encryption keys of bootable storage resources of a plurality of storage resources over retrieval of key encryption keys of non-bootable storage resources of the plurality of storage resources and prioritize decryption of media encryption keys of bootable storage resources of the plurality of storage resources using their corresponding key encryption keys over decryption of media encryption keys of non-bootable storage resources of the plurality of storage resources using their corresponding key encryption keys.

21 Claims, 3 Drawing Sheets

SYSTEMS AND METHODS FOR MINIMIZING BOOT TIME WHEN USING A UNIQUE KEY ENCRYPTION KEY PER STORAGE RESOURCE IN SECURE ENTERPRISE KEY MANAGEMENT PROVISIONING

TECHNICAL FIELD

The present disclosure relates in general to information handling systems, and more particularly to methods and systems for minimizing boot time when using a unique key encryption key per storage resource in secure enterprise key management provisioning.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As is known in the art, data associated with an information handling system may be stored on a storage resource, such as, for example, one or more hard disk drives. A type of storage resource becoming more prevalent is a self-encrypting storage resource, sometimes known as a self-encrypting drive. In a self-encrypting storage resource, data stored to the storage resource is encrypted with a media encryption key (MEK) which may also be used to decrypt such data. The MEK itself may also be encrypted with a key encryption key (KEK), which must be provided at powering up of the self-encrypting storage resource in order to unlock the MEK for use. Thus, the MEK is stored in the storage resource, while the KEK can be stored within the information handling system (known as local key management) or externally to the information handling system (e.g., maintained by a key management server implementing Secure Enterprise Key Management (SEKM)).

In many existing implementations, a single KEK may be used to encrypt/decrypt all storage resources within an information handling system. Such KEK may be stored and serviced by a key management server. During boot of the information handling system, a management controller (e.g., an Integrated Dell Remote Access Controller or "iDRAC") may securely retrieve the KEK from the key management server and forward the KEK to each storage resource in order to decrypt the individual MEKs for the storage resources, and such individual MEKs may be used to decrypt media stored on the storage resources.

However, information handling systems may move towards architectures wherein each storage resource in an information handling system may have its own unique KEK for unlocking the MEK of the storage resource. However, using existing approaches for key provisioning and use, having a unique KEK per storage resource may add significantly to book time. Because each storage resource, including a boot storage resource having bootable media stored thereon, requires a separate key, and because existing approaches do not allow for identification of boot drives before drives are accessed, system boot may be delayed until all storage resources are unlocked. Such boot time problem may exist in a number of storage topologies, including without limitation:

- a host bus adapter with numerous (e.g., 32) storage resources;
- root-port attached Non-Volatile Memory Express (NVMe) storage resources (e.g., up to 24 storage resources);
- a storage controller coupled to numerous (e.g., 32) storage resources in a server; and
- a storage controller or host bus adapter with external enclosures populated with numerous (e.g., up to 24) storage resources.

SUMMARY

In accordance with the teachings of the present disclosure, the disadvantages and problems associated with existing approaches to management of key encryption keys for use in connection with a self-encrypting storage resource may be reduced or eliminated.

In accordance with embodiments of the present disclosure, an information handling system may include a processor, a plurality of storage resources communicatively coupled to the processor, a storage controller communicatively coupled to the processor and the plurality of storage resources and configured to manage one or more functions of the plurality of storage resources; and a management controller communicatively coupled to the processor. Each storage resource may have a media encryption key for encrypting data written to such storage resource and decrypted data read from such storage resource, wherein such media encryption key is encrypted by a corresponding key encryption key, such that a unique key encryption key exists for each of the plurality of storage resources. The management controller may be configured to, during boot of the information handling system and in concert with the storage controller, prioritize retrieval of key encryption keys of bootable storage resources of the plurality of storage resources over retrieval of key encryption keys of non-bootable storage resources of the plurality of storage resources and prioritize decryption of media encryption keys of bootable storage resources of the plurality of storage resources using their corresponding key encryption keys over decryption of media encryption keys of non-bootable storage resources of the plurality of storage resources using their corresponding key encryption keys.

In accordance with these and other embodiments of the present disclosure, a management controller may be configured for management of an information handling system comprising a processor, a plurality of storage resources communicatively coupled to the processor, each storage resource having a media encryption key for encrypting data written to such storage resource and decrypted data read from such storage resource, wherein such media encryption key is encrypted by a corresponding key encryption key, such that a unique key encryption key exists for each of the plurality of storage resources. The management controller may include a communication interface for communicatively coupling to a storage controller communicatively coupled to the processor and the plurality of storage resources and configured to manage one or more functions of the plurality of storage resources and a key management utility configured to, during boot of the information handling system and in concert with the storage controller, prioritize retrieval of key encryption keys of bootable storage resources of the plurality of storage resources over retrieval of key encryption keys of non-bootable storage resources of the plurality of storage resources and prioritize decryption of media encryption keys of bootable storage resources of the plurality of storage resources using their corresponding key encryption keys over decryption of media encryption keys of non-bootable storage resources of the plurality of storage resources using their corresponding key encryption keys.

In accordance with these and other embodiments of the present disclosure, a method may be provided for use in an information handling system comprising a processor, and a plurality of storage resources communicatively coupled to the processor, each storage resource having a media encryption key for encrypting data written to such storage resource and decrypted data read from such storage resource, wherein such media encryption key is encrypted by a corresponding key encryption key, such that a unique key encryption key exists for each of the plurality of storage resources. The method may include, during boot of the information handling system, identifying bootable storage resources of the plurality of storage resources, prioritizing retrieval of key encryption keys of bootable storage resources of the plurality of storage resources over retrieval of key encryption keys of non-bootable storage resources of the plurality of storage resources, and prioritizing decryption of media encryption keys of bootable storage resources of the plurality of storage resources using their corresponding key encryption keys over decryption of media encryption keys of non-bootable storage resources of the plurality of storage resources using their corresponding key encryption keys.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 4, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

Figure 1:
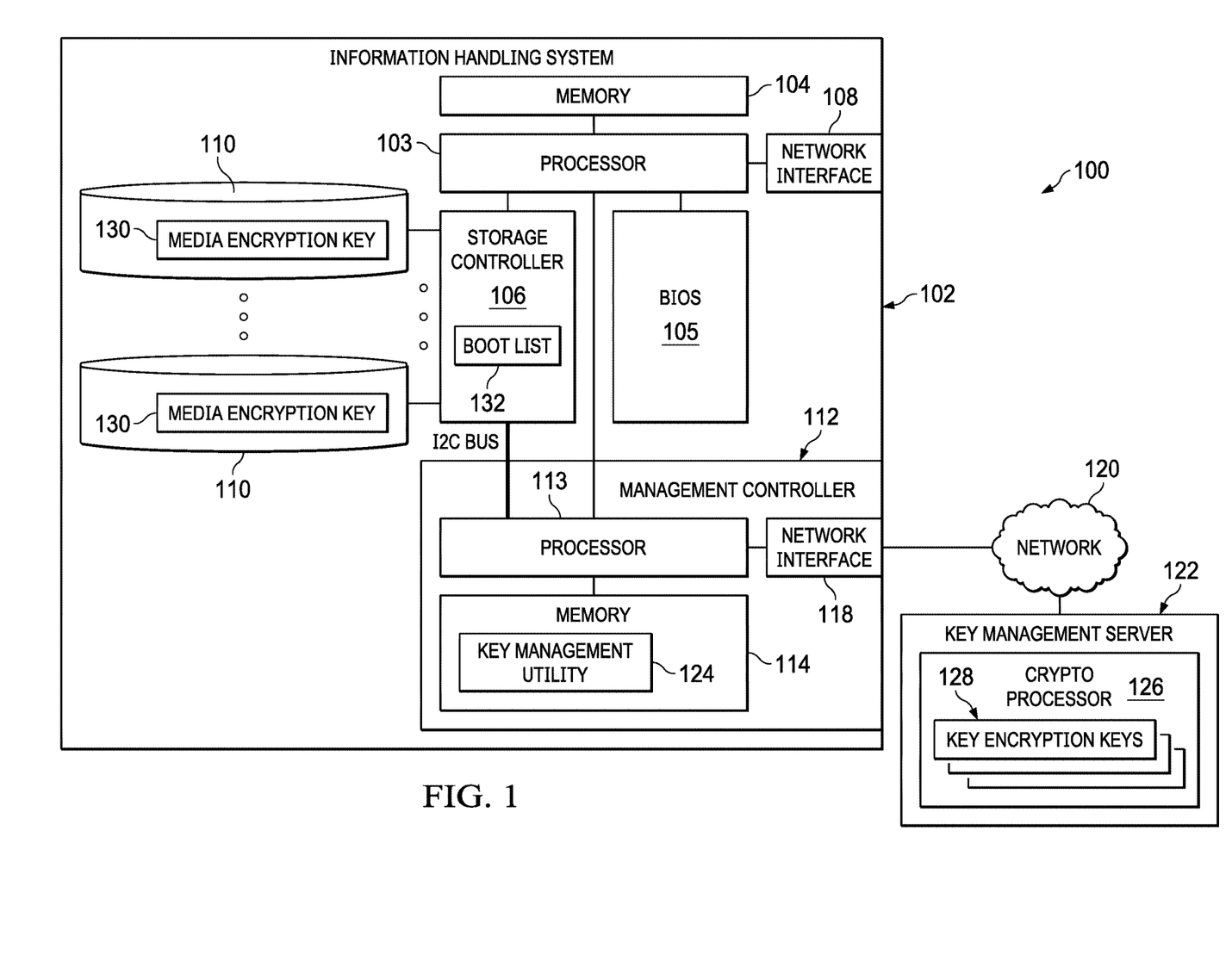
FIG. 1 illustrates a block diagram of an example system for minimizing boot time when using a unique key encryption key per storage resource, in accordance with embodiments of the present disclosure.

FIG. 1 illustrates a block diagram of an example system 100 for minimizing boot time when using a unique key encryption key per storage resource, in accordance with embodiments of the present disclosure. As shown in FIG. 1, system 100 may include an information handling system 102, a network 120, and a key management server 122.

In some embodiments, information handling system 102 may comprise or be an integral part of a server. In other embodiments, information handling system 102 may be a personal computer. In these and other embodiments, information handling system 102 may be a portable information handling system (e.g., a laptop, notebook, tablet, handheld, smart phone, personal digital assistant, etc.). As depicted in FIG. 1, information handling system 102 may include a processor 103, a memory 104 communicatively coupled to processor 103, a basic input/output (BIOS) system 105 communicatively coupled to processor 103, a storage controller 106 communicatively coupled to processor 103, a network interface 108 communicatively coupled to processor 103, a plurality of storage resources 110 communicatively coupled to storage controller 106, a management controller 112 communicatively coupled to processor 103 and storage controller 106, and a cryptoprocessor 126 communicatively coupled to processor 113 of management controller 112.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

BIOS 105 may be communicatively coupled to processor 103 and may include any system, device, or apparatus configured to identify, test, and/or initialize information handling resources of information handling system 102. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, code for BIOS 105 may be configured to set components of information handling system 102 into a known state, so that one or more applications (e.g., an operating system or other application programs) stored on compatible media (e.g., memory 104) may be executed by processor 103 and given control of information handling system 102.

Storage controller 106 may include any system, apparatus, or device operable to manage the communication of data between processor 103 and storage resources 110. In certain embodiments, storage controller 106 may provide functionality including, without limitation, disk aggregation and redundancy (e.g., RAID), I/O routing, and error detection and recovery. Storage controller 106 may also have features supporting shared storage and high availability. In some embodiments, storage controller 106 may comprise a PowerEdge RAID Controller (PERC) manufactured by Dell Inc.

As shown in FIG. 1, storage controller 106 may comprise a boot list 132 stored within storage controller 106 or otherwise accessible to storage controller 106. As described in greater detail below, boot list 132 may be a map, table, list, array, or other suitable data structure maintained by storage controller 106 which sets forth those storage resources 110 identified to be bootable storage resources 110 having bootable media stored thereon.

Network interface 108 may comprise any suitable system, apparatus, or device operable to serve as an interface between information handling system 102 and one or more other information handling systems. Network interface 108 may enable information handling system 102 to communicate using any suitable transmission protocol and/or standard. In these and other embodiments, network interface 108 may comprise a network interface card, or "NIC."

A storage resource 110 may include one or more hard disk drives, magnetic tape libraries, optical disk drives, magneto-optical disk drives, compact disk drives, compact disk arrays, disk array controllers, and/or any other system, apparatus or device operable to store media. In some embodiments, storage resource 110 may comprise a plurality of physical storage resources that may appear to an operating system or virtual machine executing on information handling system 102 as a single logical storage unit or virtual storage resource. For example, each such virtual storage resource may comprise a RAID. Thus, in some embodiments, a virtual storage resource may comprise a redundant array of physical storage resources. In the same or alternative embodiments, a virtual storage resource may be implemented using a RAID standard. Although FIG. 1 depicts storage resource 110 internal to information handling system 102, in some embodiments, storage resource 110 may be external to information handling system 102 (e.g., embodied by a physical array of external hard disk drives).

As shown in FIG. 1, in addition to data stored on a storage resource 110, a storage resource 110 may have a media encryption key (MEK) 130. In operation of storage resource 110, data written to storage resource 110 may be encrypted with MEK 130 prior to storage on storage resource 110 and data read from storage resource 110 may be decrypted with MEK 130. In such embodiments, storage resource 110 may include all necessary logic and functionality to perform such encryption and decryption, and thus storage resource 110 may comprise a self-encrypting storage resource or self-encrypting disk.

Management controller 112 may be configured to provide out-of-band management facilities for management of information handling system 102. Such management may be made by management controller 112 even if information handling system 102 is powered off or powered to a standby state. Management controller 112 may include a processor 113, memory 114, and an out-of-band network interface 118 separate from and physically isolated from in-band network interface 108. In certain embodiments, management controller 112 may include or may be an integral part of a baseboard management controller (BMC), a remote access controller (e.g., a Dell Remote Access Controller or Integrated Dell Remote Access Controller), or an enclosure controller. In other embodiments, management controller 112 may include or may be an integral part of a chassis management controller (CMC).

Processor 113 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 113 may interpret and/or execute program instructions and/or process data stored in memory 114 and/or another component of information handling system 102 or management controller 112. As shown in FIG. 1, processor 113 may be coupled to storage controller 110 via an Inter-Integrated Circuit (I2C) bus or other suitable interconnect.

Memory 114 may be communicatively coupled to processor 113 and may include any system, device, or apparatus configured to retain program instructions and/or data for a period of time (e.g., computer-readable media). Memory 114 may include RAM, EEPROM, a PCMCIA card, flash memory, magnetic storage, opto-magnetic storage, or any suitable selection and/or array of volatile or non-volatile memory that retains data after power to management controller 112 is turned off. Memory 114 may have stored thereon software and/or firmware which may be read and executed by processor 113 for carrying out the functionality of management controller 112.

As shown in FIG. 1, memory 114 may have stored thereon a key management utility 124. Key management utility 124 may include any system, device, or apparatus configured to receive an instruction to manage functions with respect to key encryption keys (KEKs) that may be used to securely encrypt MEKs 130 of storage resource 110. Example functionality of key management utility 124 is set forth in greater detail below. In some embodiments, key management utility 124 may be implemented as a program of instructions that may be read by and executed on processor 113 to carry out the functionality of key management utility 124.

Network interface 118 may comprise any suitable system, apparatus, or device operable to serve as an interface between management controller 112 and/or one or more other information handling systems. Network interface 118 may enable management controller 112 to communicate using any suitable transmission protocol and/or standard. In these and other embodiments, network interface 118 may comprise a network interface card, or "NIC."

In addition to processor 103, memory 104, BIOS 105, a storage controller 106, network interface 108, storage resource 110, and management controller 112, information handling system 102 may include one or more other information handling resources.

Network 120 may comprise a network and/or fabric configured to couple information handling system 102 and key management server 122 to each other and/or one or more other information handling systems. In these and other embodiments, network 120 may include a communication infrastructure, which provides physical connections, and a management layer, which organizes the physical connections and information handling systems communicatively coupled to network 120. Network 120 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). Network 120 may transmit data via wireless transmissions and/or wire-line transmissions using any storage and/or communication protocol, including without limitation, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or any other transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 120 and its various components may be implemented using hardware, software, or any combination thereof.

Key management server 122 may comprise an information handling system, and may include any system, device, or apparatus configured to implement Secure Enterprise Key Management to securely manage key encryption keys 128 for use by storage resources 110, as described in greater detail below.

As shown in FIG. 1, key management server 122 may comprise a cryptoprocessor 126. Cryptoprocessor 126 may include any system, device, or apparatus configured to carry out cryptographic operations on data communicated to it from information handling system 102 or elsewhere. In some embodiments, cryptoprocessor 126 may be compliant with the Trusted Platform Module specification, a successor specification, and/or any other similar specification. In some embodiments, cryptoprocessor 126 may be configured to generate random numbers, generate encryption keys (e.g., RSA keys), generate and maintain hash key tables of hardware and software components of information handling system 102, generate and maintain configuration parameters associated with hardware and software components of an information handling system, wrap (e.g., encrypt) keys, unwrap (e.g., decrypt) keys, and/or store keys (e.g., endorsement key, storage root key, attestation identity keys, storage keys). In some embodiments, cryptoprocessor 126 may comprise a non-volatile memory accessible only to cryptoprocessor 126. As shown in FIG. 1, such non-volatile memory may store a plurality of key encryption keys (KEK) 128. Each KEK 128 may comprise a cryptographic key which may be used to, among other things, decrypt a corresponding MEK 130 upon initialization of storage resource 110 such that MEK 130 may be unlocked for use to encrypt data written to storage resource 110 and/or decrypt data read from storage resource 110. In embodiments of the present disclosure, each storage resource 110 of information handling system 102 may have its own unique corresponding KEK 128 stored on key management server 122.

In operation, storage controller 106 may identify which of storage resources 110 are bootable storage resources comprising bootable media for booting information handling system 102 and store identifying information for such storage resources 110 in boot list 132 accessible to management controller 112. In turn, key management utility 124 may, during a boot of information handling system 102, use boot list 132 to prioritize communication of KEKs 128 to storage controller 106 for bootable storage resources 110. Accordingly, storage controller 106 may be enabled to unlock (e.g., provide KEK 128 to) bootable storage resources 110 before unlocking of non-bootable storage-resources, which may minimize boot time, as bootable storage resources 110 may be unlocked first in order to boot information handling system 102, while non-bootable storage resources 110 may be unlocked in the background during or after boot.

The key management approach disclosed herein may be divided into two phases: a provisioning phase and a runtime phase.

In the provisioning phase, storage controller 106 or another information handling resource of information handling system 102 may identify which storage resources 110 are bootable storage resources 110 and may persistently store unique identifiers associated with bootable storage resources 110 within boot list 132, which may be accessible to management controller 112. Bootable storage resources 110 may be identified in any suitable manner including:

1) iteratively unlocking storage resources 110, and when information handling system 102 boots from a storage resource 110, storage controller 106 adds a unique identifier associated with the storage resource 110 to boot list 132;

2) using the systems and method for identifying a bootable storage resource 110 as described in U.S. patent application Ser. No. 16/149,853 filed Oct. 2, 2018 (which is incorporated by reference herein); and 3) manual identification by an administrator or other information technology technician at runtime, such as when a new bootable partition is created at runtime.

Figure 2:
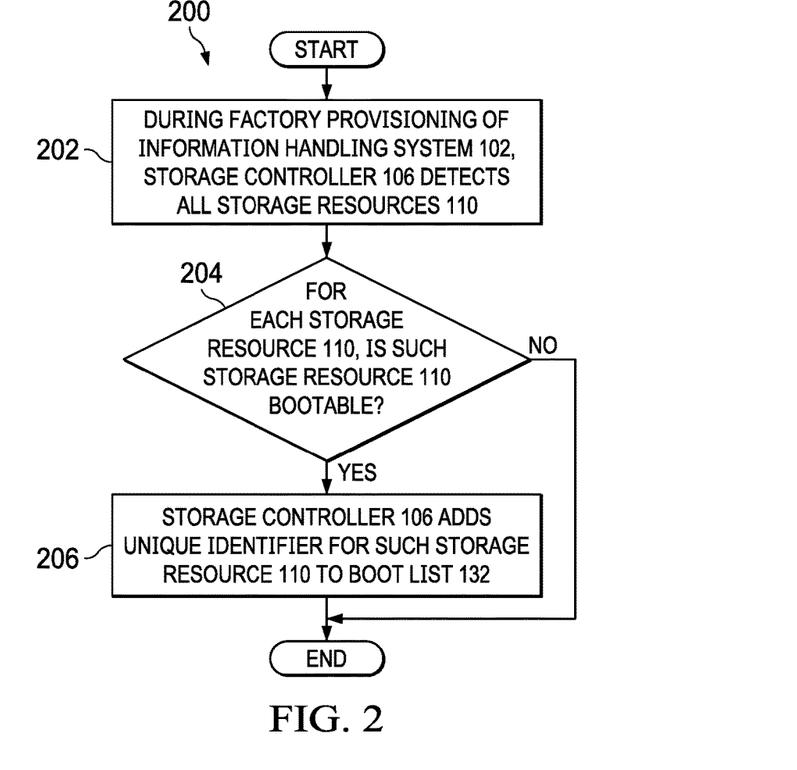
FIG. 2 illustrates a flow chart of an example method for factory provisioning of a boot list, in accordance with embodiments of the present disclosure.

FIG. 2 illustrates a flow chart of an example method 200 for factory provisioning of boot list 132, in accordance with embodiments of the present disclosure. According to some embodiments, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen.

At step 202, during factory provisioning of information handling system 102 and when all storage resources 110 have been fully provisioned, storage controller 106 may detect all storage resources 110. For each of detected storage resources 110, storage controller 106 may execute steps 204 and 206 below.

At step 204, for each storage resource 110, storage controller 106 may determine if such storage resource 110 is bootable. For example, in some embodiments, storage controller 106 may determine a storage resource 110 is bootable due to information handling system 102 successfully booting from such storage resource 110. As another example, in other embodiments, storage controller 106 may determine a storage resource 110 is bootable in accordance with the methods and systems described in U.S. patent application Ser. No. 16/149,853 filed Oct. 2, 2018, referenced above. If such storage resource 110 is bootable, method 200 may proceed to step 206 for such storage resource 110, otherwise method 200 may end as to such storage resource 110.

At step 206, storage controller 106 may add a unique identifier for such storage resource 110 to boot list 132. After completion of step 206 for all storage resources 110 identified as bootable, method 200 may end.

Although FIG. 2 discloses a particular number of steps to be taken with respect to method 200, method 200 may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using information handling system 102 or any other system operable to implement method 200. In certain embodiments, method 200 may be implemented partially or fully in software and/or firmware embodied in computer-readable media.

Figure 3:
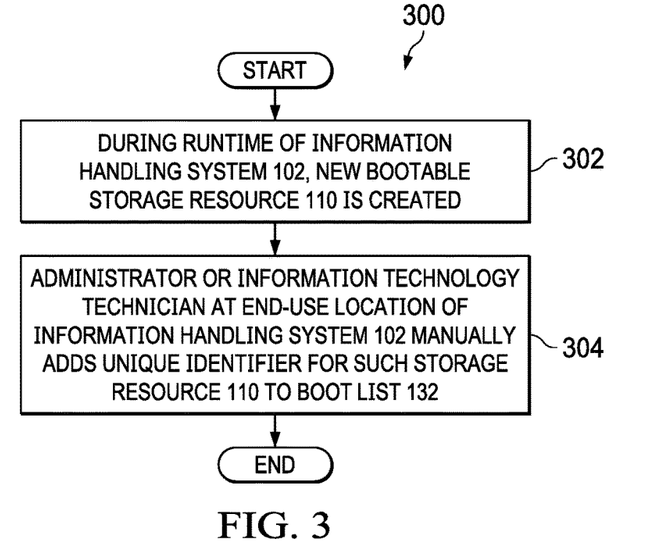
FIG. 3 illustrates a flow chart of an example method for end use provisioning of a boot list, in accordance with embodiments of the present disclosure.

FIG. 3 illustrates a flow chart of an example method 300 for end use provisioning of boot list 132, in accordance with embodiments of the present disclosure. According to some embodiments, method 300 may begin at step 302. As noted above, teachings of the present disclosure may be implemented in a variety of configurations of information handling system 102. As such, the preferred initialization point for method 300 and the order of the steps comprising method 300 may depend on the implementation chosen.

At step 302, during runtime of information handling system 102, a new bootable storage resource 110 may be created (e.g., by an administrator or information technology technician at the end-use location of information handling system 102). At step 304, in response to creating the new bootable storage resource, an administrator or information technology technician at the end-use location of information handling system 102 may manually add a unique identifier for such storage resource 110 to boot list 132. After completion of step 304, method 300 may end.

Although FIG. 3 discloses a particular number of steps to be taken with respect to method 300, method 300 may be executed with greater or fewer steps than those depicted in FIG. 3. In addition, although FIG. 3 discloses a certain order of steps to be taken with respect to method 300, the steps comprising method 300 may be completed in any suitable order.

In the runtime phase, boot list 132 may be accessible to management controller 112. During boot of information handling system 102, key management utility 124 of management controller 112 may retrieve boot list 132, and obtain from key management server 122 those KEKs 128 for storage resources 110 on boot list 132. Key management utility 124 may then forward such KEKs 128 to storage controller 106 to enable storage controller 106 to unlock bootable storage resources 110. Once bootable storage resources 110 are unlocked, information handling system 102 may complete boot, and management controller 112 and storage controller 106 may work in concert to retrieve KEKs 128 for non-bootable storage resources 110 and unlock such non-bootable storage resources 110 during and/or after boot of information handling system 102.

Figure 4:
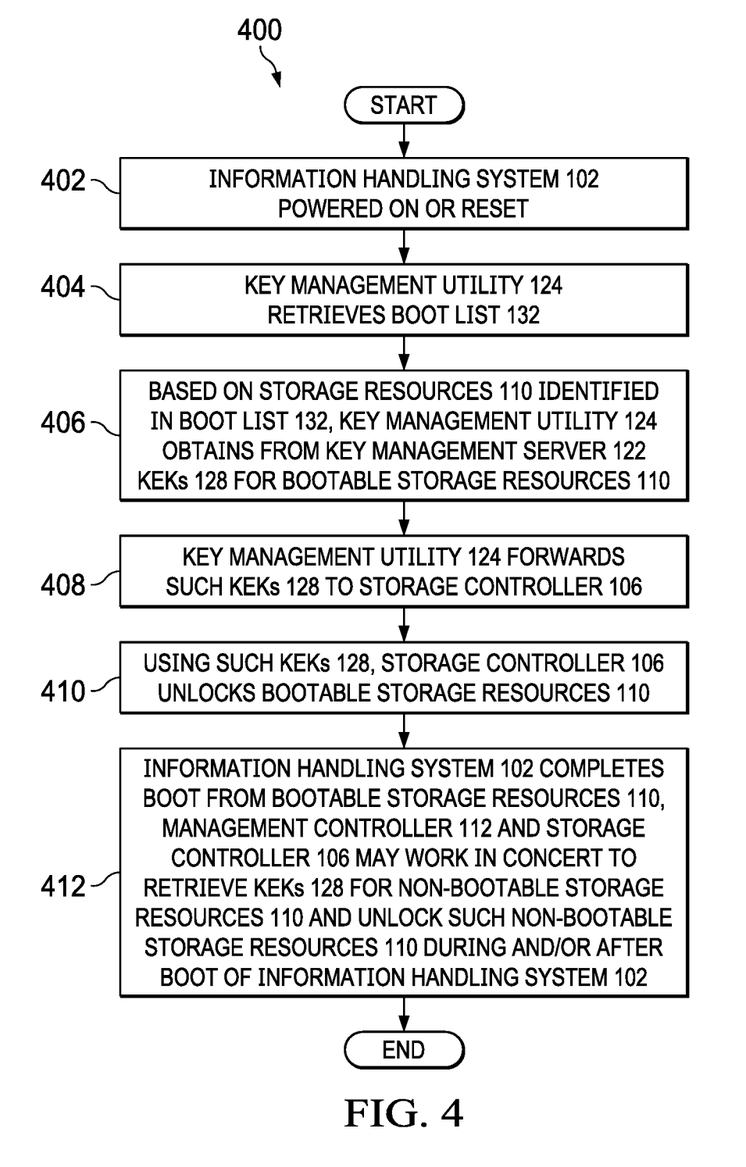
FIG. 4 illustrates a flow chart of an example method for unlocking storage resources with their uniquely-associated KEKs, in accordance with embodiments of the present disclosure.

FIG. 4 illustrates a flow chart of an example method 400 for unlocking storage resources 110 with their uniquely-associated KEKs 128, in accordance with embodiments of the present disclosure. According to some embodiments, method 400 may begin at step 402. As noted above, teachings of the present disclosure may be implemented in a variety of configurations of information handling system 102. As such, the preferred initialization point for method 400 and the order of the steps comprising method 400 may depend on the implementation chosen.

At step 402, information handling system 102 may be powered on or reset. At step 404, key management utility 124 of management controller 112 may retrieve boot list 132. At step 406, based on those storage resources 110 identified in boot list 132, key management utility 124 may obtain from key management server 122 KEKs 128 for bootable storage resources 110. At step 408, key management utility 124 may forward such KEKs 128 to storage controller 106. At step 410, using such KEKs 128, storage controller 106 may unlock bootable storage resources 110 (e.g., use KEKs 128 to decrypt MEKs 130). At step 412, information handling system 102 may complete boot from bootable storage resources 110, and management controller 112 and storage controller 106 may work in concert to retrieve KEKs 128 for non-bootable storage resources 110 and unlock such non-bootable storage resources 110 during and/or after boot of information handling system 102. After completion of step 412, method 400 may end.

Although FIG. 4 discloses a particular number of steps to be taken with respect to method 400, method 400 may be executed with greater or fewer steps than those depicted in FIG. 4. In addition, although FIG. 4 discloses a certain order of steps to be taken with respect to method 400, the steps comprising method 400 may be completed in any suitable order.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described above, the principles of the present disclosure may be implemented using any number of techniques, whether currently known or not. The present disclosure should in no way be limited to the exemplary implementations and techniques illustrated in the figures and described above.

Unless otherwise specifically noted, articles depicted in the figures are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
   a processor;
   a plurality of storage resources communicatively coupled to the processor, each storage resource having a media encryption key for encrypting data written to such storage resource and decrypted data read from such storage resource, wherein such media encryption key is encrypted by a corresponding key encryption key, such that a unique key encryption key exists for each of the plurality of storage resources;
   a storage controller communicatively coupled to the processor and the plurality of storage resources and configured to manage one or more functions of the plurality of storage resources; and
   a management controller communicatively coupled to the processor and configured to, during boot of the information handling system and in concert with the storage controller, prioritize retrieval of key encryption keys of bootable storage resources of the plurality of storage resources over retrieval of key encryption keys of non-bootable storage resources of the plurality of storage resources and prioritize decryption of media encryption keys of bootable storage resources of the plurality of storage resources using their corresponding key encryption keys over decryption of media encryption keys of non-bootable storage resources of the plurality of storage resources using their corresponding key encryption keys.

2. The information handling system of claim 1, wherein the management controller is further configured to:
   retrieve unique identifiers associated with the bootable storage resources; and
   based on such unique identifiers, prioritize retrieval of key encryption keys of bootable storage resources over retrieval of key encryption keys of non-bootable storage resources.

3. The information handling system of claim 2, wherein the management controller is configured to retrieve key encryption keys of the plurality of storage resources from a key management server communicatively coupled to the management controller via a network.

4. The information handling system of claim 2, wherein the management controller is further configured to, based on such unique identifiers, prioritize transmission of key encryption keys of bootable storage resources to the storage controller over retrieval of key encryption keys of non-bootable storage resources.

5. The information handling system of claim 4, wherein the storage controller is configured to prioritize decryption of media encryption keys of bootable storage resources over decryption of media encryption keys of non-bootable storage resources based on an order of receipt of key encryption keys from the management controller.

6. The information handling system of claim 2, wherein the management controller is configured to retrieve the unique identifiers associated with the bootable storage resources from a boot list of unique identifiers created during factory provisioning of the information handling system.

7. The information handling system of claim 2, wherein the management controller is configured to retrieve the unique identifiers associated with the bootable storage resources from a boot list of unique identifiers created during intended end use of the information handling system.

8. A management controller configured for management of an information handling system comprising a processor, a plurality of storage resources communicatively coupled to the processor, each storage resource having a media encryption key for encrypting data written to such storage resource and decrypted data read from such storage resource, wherein such media encryption key is encrypted by a corresponding key encryption key, such that a unique key encryption key exists for each of the plurality of storage resources, the management controller comprising:
- a communication interface for communicatively coupling to a storage controller communicatively coupled to the processor and the plurality of storage resources and configured to manage one or more functions of the plurality of storage resources; and
- a key management utility configured to, during boot of the information handling system and in concert with the storage controller, prioritize retrieval of key encryption keys of bootable storage resources of the plurality of storage resources over retrieval of key encryption keys of non-bootable storage resources of the plurality of storage resources and prioritize decryption of media encryption keys of bootable storage resources of the plurality of storage resources using their corresponding key encryption keys over decryption of media encryption keys of non-bootable storage resources of the plurality of storage resources using their corresponding key encryption keys.

9. The management controller of claim 8, wherein the key management utility is further configured to:
- retrieve unique identifiers associated with the bootable storage resources; and
- based on such unique identifiers, prioritize retrieval of key encryption keys of bootable storage resources over retrieval of key encryption keys of non-bootable storage resources.

10. The management controller of claim 9, wherein the key management utility is configured to retrieve key encryption keys of the plurality of storage resources from a key management server communicatively coupled to the management controller via a network.

11. The management controller of claim 9, wherein the key management utility is further configured to, based on such unique identifiers, prioritize transmission of key encryption keys of bootable storage resources to the storage controller over retrieval of key encryption keys of non-bootable storage resources.

12. The management controller of claim 11, wherein the storage controller is configured to prioritize decryption of media encryption keys of bootable storage resources over decryption of media encryption keys of non-bootable storage resources based on an order of receipt of key encryption keys from the management controller.

13. The management controller of claim 9, wherein the key management utility is configured to retrieve the unique identifiers associated with the bootable storage resources from a boot list of unique identifiers created during factory provisioning of the information handling system.

14. The management controller of claim 9, wherein the key management utility is configured to retrieve the unique identifiers associated with the bootable storage resources from a boot list of unique identifiers created during intended end use of the information handling system.

15. A method for use in an information handling system comprising a processor, and a plurality of storage resources communicatively coupled to the processor, each storage resource having a media encryption key for encrypting data written to such storage resource and decrypted data read from such storage resource, wherein such media encryption key is encrypted by a corresponding key encryption key, such that a unique key encryption key exists for each of the plurality of storage resources, the method comprising, during boot of the information handling system:
- identifying bootable storage resources of the plurality of storage resources;
- prioritizing retrieval of key encryption keys of bootable storage resources of the plurality of storage resources over retrieval of key encryption keys of non-bootable storage resources of the plurality of storage resources; and
- prioritizing decryption of media encryption keys of bootable storage resources of the plurality of storage resources using their corresponding key encryption keys over decryption of media encryption keys of non-bootable storage resources of the plurality of storage resources using their corresponding key encryption keys.

16. The method of claim 15, further comprising:
- retrieving unique identifiers associated with the bootable storage resources in order to identify the bootable storage resources; and
- based on such unique identifiers, prioritizing retrieval of key encryption keys of bootable storage resources over retrieval of key encryption keys of non-bootable storage resources.

17. The method of claim 16, further comprising retrieving key encryption keys of the plurality of storage resources from a key management server communicatively coupled to the management controller via a network.

18. The method of claim 16, further comprising, based on such unique identifiers, prioritizing transmission of key encryption keys of bootable storage resources to a storage controller for managing the plurality of storage resources over retrieval of key encryption keys of non-bootable storage resources.

19. The method of claim 18, wherein the storage controller is configured to prioritize decryption of media encryption keys of bootable storage resources over decryption of media encryption keys of non-bootable storage resources based on an order of receipt of key encryption keys from the management controller.

20. The method of claim 16, further comprising retrieving the unique identifiers associated with the bootable storage resources from a boot list of unique identifiers created during factory provisioning of the information handling system.

21. The method of claim 16, further comprising retrieving the unique identifiers associated with the bootable storage resources from a boot list of unique identifiers created during intended end use of the information handling system.

* * * * *